United States Patent [19]

Easley

[11] 4,091,559
[45] May 30, 1978

[54] TROTLINE REEL

[76] Inventor: Richard Arlen Easley, Rte. #1 - Box 456, Blanchard, Okla. 73010

[21] Appl. No.: 722,341

[22] Filed: Sep. 10, 1976

[51] Int. Cl.² ...................... A01K 97/06; A01K 87/00
[52] U.S. Cl. .................................. 43/54.5 A; 242/96; 242/106
[58] Field of Search .................. 242/106, 96, 99, 100, 242/85.1, 84.1 R, 86.7, 86.64, 63, 84.5 R; 43/54.5 A, 27.4

[56] References Cited

U.S. PATENT DOCUMENTS

| 330,610 | 11/1885 | Newth | 242/99 |
| 469,687 | 3/1892 | Felix | 242/85.1 |
| 2,007,050 | 7/1935 | Hirschmann | 242/100 X |
| 3,022,601 | 2/1962 | Martin | 43/54.5 A |
| 3,818,625 | 6/1974 | Shults | 43/54.5 A |

FOREIGN PATENT DOCUMENTS

| 57,415 | 10/1922 | Sweden | 43/54.5 A |

Primary Examiner—George F. Mautz
Attorney, Agent, or Firm—William R. Laney

[57] ABSTRACT

A trotline reel having a support on which a shaft is rotatably mounted. Mounted on the shaft for rotation therewith together with a spool on which a trotline is wound and unwound is a hook-retaining disc provided with slots disposed for receiving the fishhooks of leaders connected to the trotline and having a layer of resilient material arranged on the radial face of the disc disposed farthest from the spool for detachably storing the hooks when the trotline is wound on the spool.

4 Claims, 6 Drawing Figures

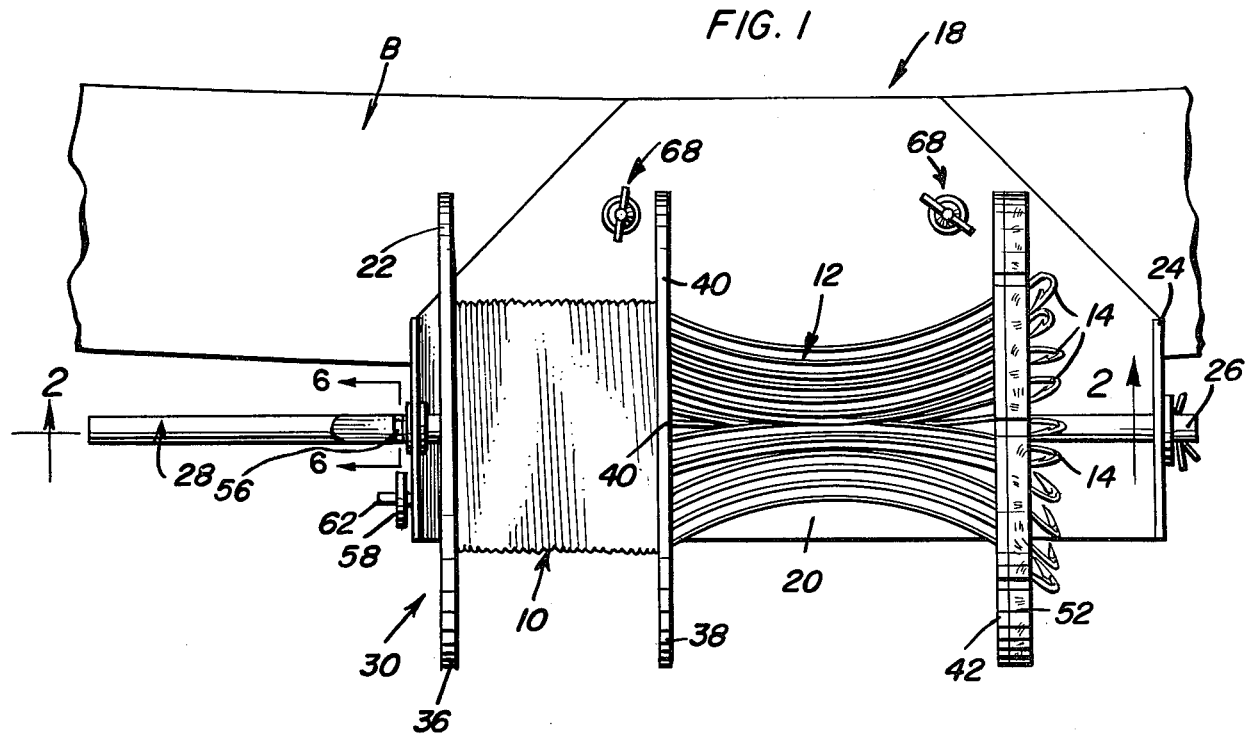
FIG. 1
FIG. 6
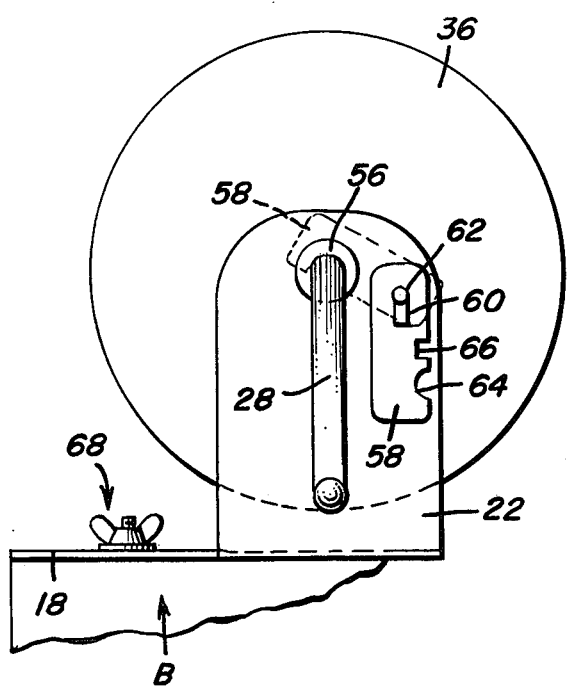
FIG. 5
FIG. 4

TROTLINE REEL

BACKGROUND OF THE INVENTION

1. Field of the Invention

This invention relates generally to winding and reeling devices, and particularly to a reel which is particularly intended to support, store, and handle a trotline in a tangle-free and safe manner.

2. Description of the Prior Art

The tangling difficulties commonly encountered with the use of trotlines presents a particularly annoying and time-consuming problem to a trotline fisherman. To help alleviate this tangling problem, various proposals have been made for devices generally referred to as trotline reels or spools which will prevent the trotline and the hook-retaining leaders associated therewith from becoming tangled. Examples of such prior art devices can be found in U.S. Pat. Nos: 2,041,322, issued May 19, 1936, to V. Cantini, 2,629,197, issued Feb. 24, 1953, to J. B. Duvall, 3,022,601, issued Feb. 27, 1962, to W. W. Martin, 3,660,924, issued May 9, 1972, to R. V. McGee, Jr., 3,818,625, issued June 25, 1974, to T. B. Shults.

A common feature found in all of the aforementioned prior art trotline reels is that they necessarily make some provision for storing the fishhooks when the trotline is wound upon the reel. Generally, the leaders and hooks are secured to a flange or similar element spaced from the spool of the reel.

SUMMARY OF THE INVENTION

It is an object of the present invention to provide a trotline reel of simple, yet rugged and reliable, construction.

It is another object of the present invention to provide a trotline reel which includes particularly convenient means for the storage of the fishhooks associated with a trotline.

These and other objects are achieved according to the present invention by providing a trotline reel having: a support; a shaft rotatably mounted on the support; a spool mounted for rotation with the shaft and winding and unwinding a trotline; and a hook-retaining arrangement mounted on the support for detachably storing fishhooks of hook-carrying leaders connected to the trotline. More specifically, the hook-retaining arrangement includes a disc affixed to the shaft and provided with a plurality of radial slots extending from a periphery of the disc for receiving shanks of the fishhooks, and a resilient layer attached to a radial surface of the disc facing away from the associated spool for receiving the points of the fishhooks and thus securing the fishhooks to the disc.

The spool advantageously includes a pair of heads disposed substantially parallel to one another, with the one of the heads disposed closest to the hook-retaining disc being provided with radial slots for receiving the leaders and guiding the leaders toward the disc.

A rectangular notch is preferably provided in the shaft adjacent a handle portion thereof for selectively engaging with a brake latch slidably and pivotally mounted on the support at a point adjacent the notch. The brake latch is provided with a peripheral curved ride slot and a peripheral rectangular brake slot, with the slots being selectively engaged with the notch. When the ride slot is engaged with the notch, the shaft is permitted to rotate, while when the brake slot engages the notch, the shaft is locked against rotation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary, top plan view showing a trotline reel according to the present invention.

FIG. 4 is a fragmentary, end elevational view looking from the right in FIG. 1.

FIG. 5 is a fragmentary, end elevational view looking from the left in FIG. 1.

FIG. 6 is a cross-sectional view taken through the shaft and illustrating the C-shaped notch adjacent the handle portion of the invention.

DESCRIPTION OF THE PREFERRED EMBODIMENTS

Figure 3:
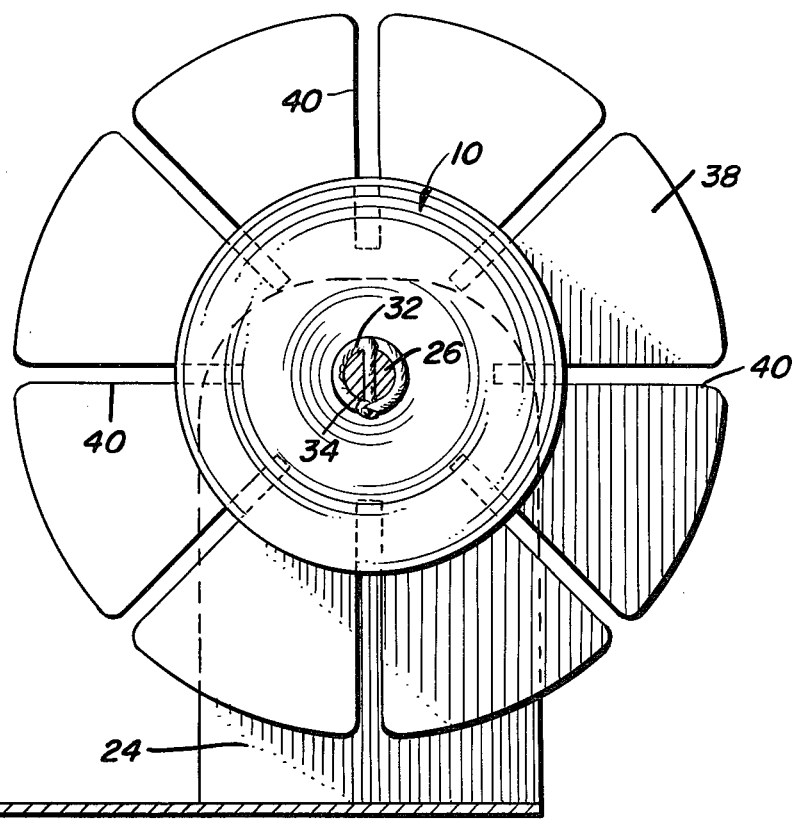
FIG. 3 is a sectional view taken generally along the line 3—3 of FIG. 2.
Figure 2:
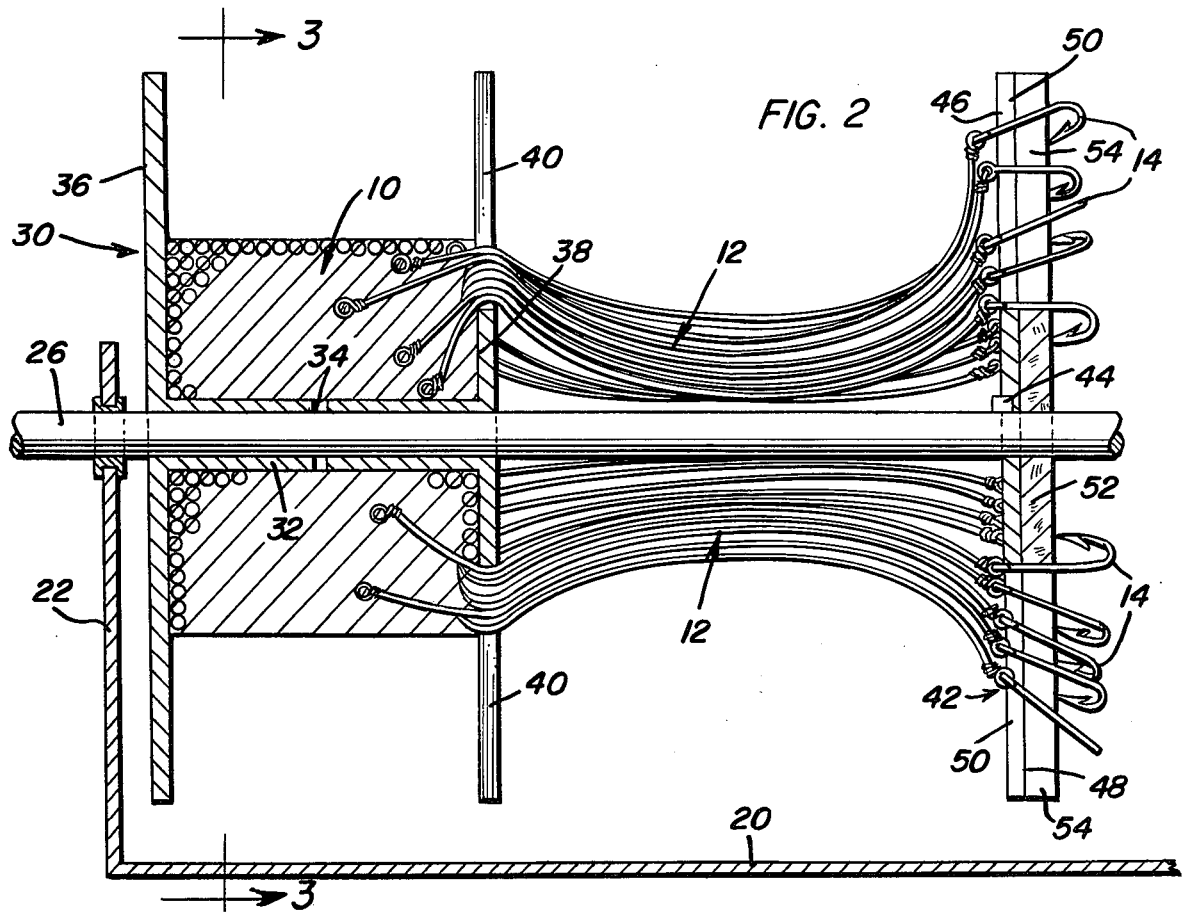
FIG. 2 is an enlarged, fragmentary, sectional view taken generally along the line 2—2 of FIG. 1.

Referring now more particularly to FIGS. 1 through 4 of the drawings, a trotline 10 of conventional construction so as to have spaced along the length thereof a plurality of leaders 12, each having a fishhook 14 connected thereto, is shown mounted on a trotline reel 16 according to the present invention. While trotline 10 is shown wound upon reel 16 in FIGS. 1 through 4, it is to be understood that in use the trotline 10, together with its associated leaders 12 and hooks 14 would be unwound from reel 16 so as to be played-out over a stretch of water to be fished.

Reel 16 includes a support in the form of a substantially U-shaped bracket 18 having a back portion 20 attachable to a boat B, and the like, in a conventional manner, and also having a pair of substantially parallel legs 22 and 24 disposed extending codirectionally from back portion 20 at longitudinally spaced ends of back portion 20. Journaled in suitable apertures provided in legs 22 and 24 is a shaft 26 which terminates at one end thereof in a crank handle 28 which facilitates rotation of shaft 26.

Mounted on the longitudinal extent of shaft 26, adjacent leg 22 of bracket 18, for rotation with the shaft 26 is a spool 30 for winding and unwinding trotline 10. This spool 30 includes a cylindrical hub 32 affixed to shaft 26 as by the illustrated pin 34 and forming a surface on which the trotline 10 is normally wound. A pair of heads 36 and 38 are disposed at ends of the hub 32, with one of the heads 36, 38 being on a respective one of the ends of hub 32. Head 38 is provided with a plurality of radial slots 40 disposed about the periphery of the generally disc-shaped element for receiving a respective one of the leaders 12 attached to trotline 10. The spacing of slots 40 about the axis of rotation of the associated head 38 is advantageously made uniform, although it is to be understood that the number of leaders 12 attached to a particular trotline 10 may vary.

A hook-retaining arrangement of reel 16 includes a disc 42 affixed to shaft 26 in a conventional manner, such as by use of the illustrated key 44, and being provided with a pair of substantially parallel, planar, radial faces 46 and 48. Extending radially inwardly from the periphery of disc 42 are a plurality of slots 50 arranged for receiving the shanks of the fishhooks 14. As can be appreciated, slots 50 are preferably aligned with the slots 40 provided in head 38, with head 38 being disposed generally opposite disc 42. A layer 52 of a resilient material, such as a natural or synthetic rubber, is affixed to the face 48 of disc 42 and is provided with slots 54 which match with slots 50 in order to permit the curved portions of the hooks 14 to extend completely through the slots 50 and 54 and cause the points of the hooks 14 to penetrate the resilient layer 52 and retain the hooks 14 on disc 42. In this manner, the fishhooks 14 are stored on reel 16 with the barbs of the fishhooks 14 embedded in the resilient layer 52 so as to achieve a storing of the fishhooks 14 which will be safe to the fisherman and other persons around the trotline reel 16 and which will also prevent damage to the points and barbs of the fishhooks 14.

As can best be seen from FIG. 5 of the drawings, a notch 56 substantially in the shape of a "C" is provided in shaft 26 between handle 28 and leg 22 of bracket 18. A brake latch 58 is slidably and pivotally mounted on leg 22 as by the illustrated elongated window 60 provided in latch 58 and the cooperating pin 62 provided on leg 22. Provided in a common peripheral edge of latch 58 is a curved ride slot 64 and a generally rectangular brake slot 66. These slots 64 and 66 selectively engage with notch 56, with the ride slot 64 permitting rotation of shaft 26 with but a slight drag on the shaft and, accordingly, the spool 30. When brake slot 66 engages with notch 56, it will be appreciated that the engagement is substantially mating so as to lock shaft 26 against rotation.

A pair of conventional clamps 68, such as those using the illustrated wing nuts, can be employed in conjunction with back portion 20 of bracket 18 in order to selectively secure bracket 18 to a boat B, and the like, as desired, when fishing with the trotline 10.

As can be understood from the above description and from the drawings, a trotline reel according to the present invention provides a simple yet rugged, reliable, and safe device for facilitating the handling of a trotline and preventing the trotline from becoming tangled and/or the hooks of the trotline becoming engaged with persons in the vicinity of the trotline, or into engagement with various parts of the associated boat, pier, or other structure with which the trotline is being used.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A trotline reel, comprising, in combination:
 a support including a substantially U-shaped bracket having a back portion attachable to a supporting structure and a pair of substantially parallel spaced legs extending codirectionally from the back portion;
 a shaft rotatably mounted on said support and including portions journaled on said legs, said shaft including and defining a substantially C-shaped notch around a portion of said shaft of generally rectangular configuration;
 a handle connected to said shaft facilitating rotation of the shaft;
 a brake latch slidably and pivotally mounted on one of the legs of said bracket disposed adjacent the handle of the shaft, said brake latch being provided with a peripheral curved ride slot and a rectangular brake slot with said slots positioned on said latch for selectively engaging the notch in said shaft, with the ride slot permitting rotation of the shaft, and the brake slot mating with said C-shaped notch to lock the shaft against rotation;
 spool means located on the shaft for rotation therewith in winding and unwinding a trotline, said spool means including:
  a cylindrical hub on which the trotline is normally wound and which has a pair of ends; and
  a pair of heads mounted on the hub at the ends thereof, one of said heads being provided with radial slots for receiving the leaders provided on the trotline; and
 hook-retaining means mounted on the support for detachably storing hooks of hook-carrying leaders connected to the trotline, said hook-retaining means including:
  a disk having a pair of substantially parallel radial faces and a periphery extending between the faces, said disk being affixed to said shaft and provided with a plurality of slots extending radially from the periphery of the disk for receiving portions of the fishhooks of the trotline, and
  a resilient layer attached to one of the radial faces of the disk which is facing away from the spool for receiving the points of the hooks and causing the hooks to be securely stored on the disk, the one of the heads of said spool which is provided with radial slots being disposed on the shaft closest to the disk.

2. A trotline reel, comprising, in combination:
 a support;
 a shaft rotatably mounted on the support and including a substantially C-shaped notch;
 a handle connected to the shaft adjacent said C-shaped slot;
 a brake latch slidably and pivotally mounted on said support at a point adjacent said handle, said brake latch being provided with a peripheral curved ride slot and a rectangular brake slot, the slots selectively engaging the notch, with the ride slot permitting rotation of the shaft under a slight drag and the brake slot mating with the notch in the shaft to lock the shaft against rotation;
 spool means mounting on the shaft for rotation therewith in winding and unwinding a trotline; and
 hook-retaining means mounted on the support for detachably storing hooks of hook-carrying leaders connected to the trotline.

3. In combination with a trotline including a plurality of leaders each provided with a fishhook, a trotline reel, comprising, in combination:
 a support;
 a shaft rotatably mounted on the support and including a substantially C-shaped notch;
 a handle connected to the shaft adjacent the notch for facilitating rotation of the shaft;
 a brake latch slidably and pivotally mounted on the support at a point adjacent the handle, said brake latch being provided with a peripheral curved ride slot and a rectangular brake slot, the slots selectively engaging the notch, with the ride slot permitting rotation of the shaft under a slight drag and the brake slot mating with the notch to lock the shaft against rotation;

spool means mounted on the shaft for rotation therewith in winding and unwinding the trotline; and hook-retaining means mounted on the support for detachably storing the fishhooks.

4. The combination which includes a trotline having a plurality of leaders and a trotline reel comprising:

a support bracket;

a shaft rotatably mounted on the support bracket and including a notch in the shaft having a pair of substantially parallel sides;

a handle connected to the shaft for rotating the shaft;

spool means mounted on the shaft for rotation therewith and for winding and unwinding the trotline; and hook-retaining means mounted on said shaft for rotation therewith for detachably storing fishhooks and located at a position axially spaced along the shaft from said spool means; and a brake latch slidably and pivotally mounted on said support for pivoting about an axis extending substantially parallel to the axis of said shaft and for sliding in a direction which is radial with respect to said pivotal axis, said brake latch including a first slot in one edge of the brake latch having a curved bottom and a second slot in the same edge of the brake latch as said first slot, said second slot being substantially rectangular in configuration, said slots being selectively engageable, by selective sliding movement of said brake latch, with said notch in said shaft so that, when said first slot is engaged with said notch, said shaft can undergo rotation, and when said second slot is engaged with said notch in said shaft, said shaft is locked against rotation.

* * * * *